UNITED STATES PATENT OFFICE.

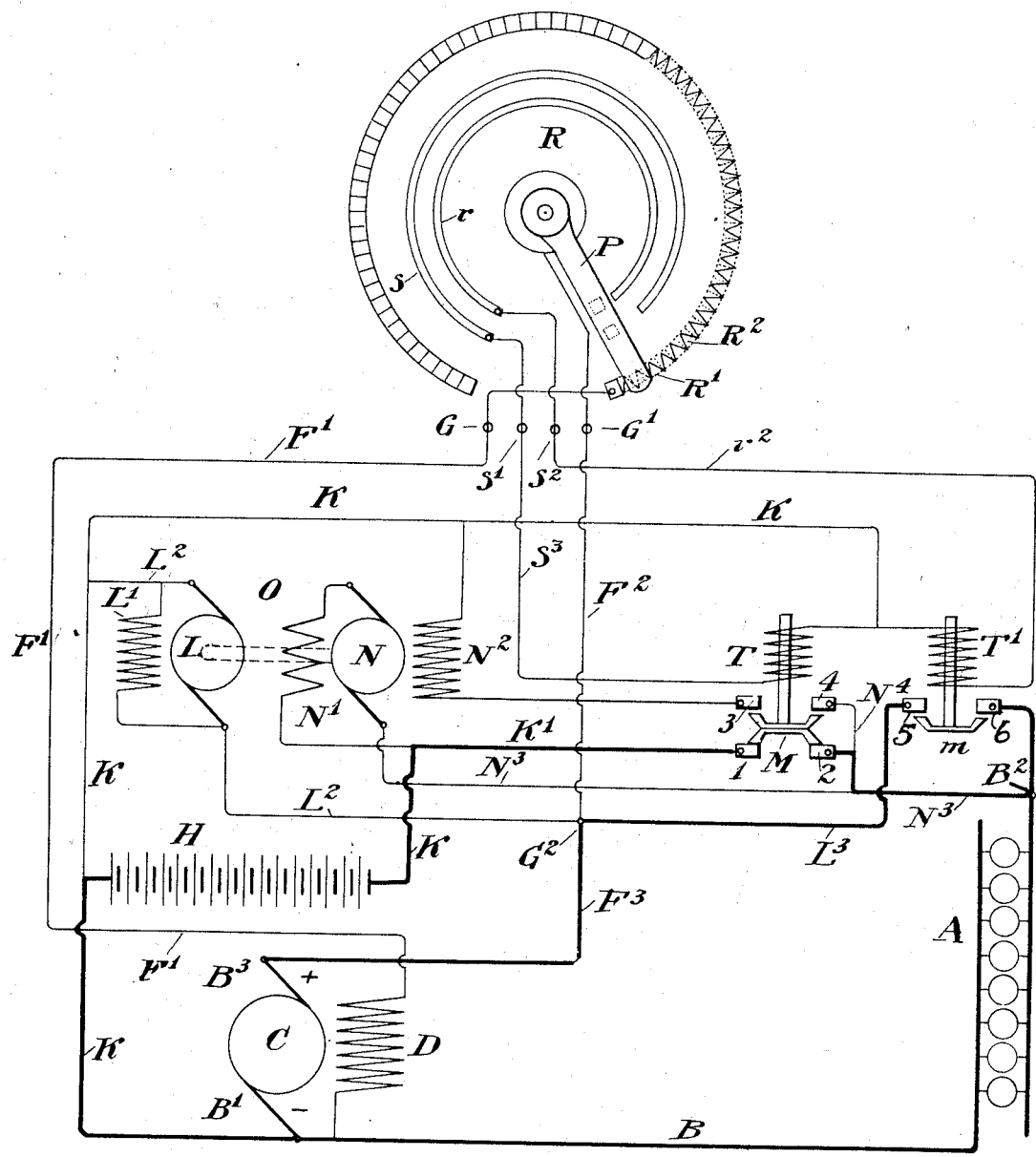

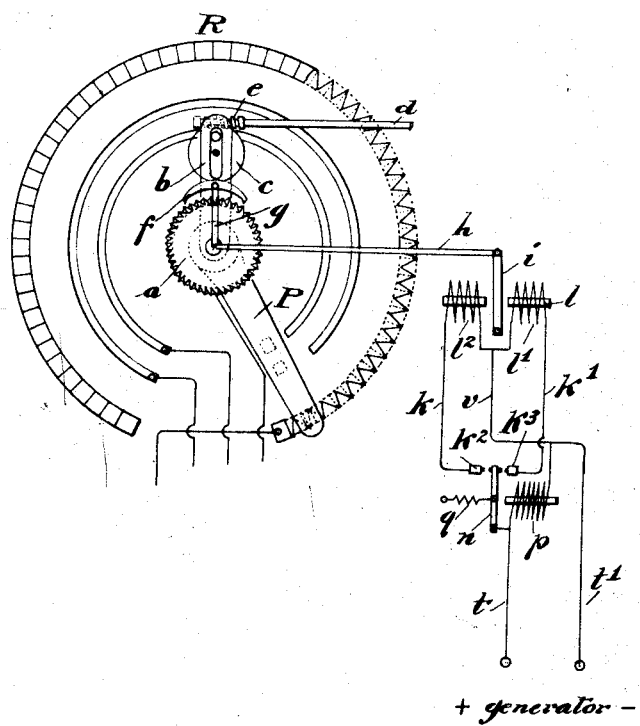

JOHN W. JEPSON, OF NEW YORK, N. Y., ASSIGNOR, BY MESNE ASSIGNMENTS, TO GOULD COUPLER COMPANY, A CORPORATION OF NEW YORK.

SYSTEM OF ELECTRICAL DISTRIBUTION.

981,197.  Specification of Letters Patent.  Patented Jan. 10, 1911.

Application filed August 29, 1905. Serial No. 276,276.

*To all whom it may concern:*

Be it known that I, JOHN W. JEPSON, a citizen of the United States, residing in the city, county, and State of New York, have invented new and useful Improvements in Systems of Electrical Distribution; and in order that others skilled in the art may understand, make, and use my invention I give the following specification thereof.

My invention relates to systems of electrical distribution and more particularly to such systems applied to the lighting of cars or other vehicles.

The objects of my invention are to provide a system of distribution adapted to the lighting of cars and other vehicles, or for use generally where the generator is subjected to variations in driving speed; to provide a system operating automatically to supply a substantially constant voltage to the lamps or load circuit; to provide such a system with auxiliary devices to feed the load circuit when the generator voltage is insufficient and to store the surplus energy at other times, together with automatic regulating devices for securing the operation of the several parts of system in the most efficient and reliable manner. The manner and means by which these and other objects of the invention are accomplished are fully set forth in the following specification.

In the accompanying drawings forming a part of this specification Figure 1 is a general diagram of a system embodying one form of my improvements; Fig. 2 a detail diagram of certain features of the generator regulator shown in Fig. 1.

In these drawings C indicates the generator which may be driven by any suitable connection (not shown) from the axle of the car or vehicle. Any other driving means may of course be employed if desired—for instance, direct connection with a gas or other engine. The lamp or load circuit is shown at A which has direct connection with the generator C through the conductor $F^3$ leading from the positive brush $B^3$, branch $L^3$, circuit closer $m$, conductor B back to the negative brush $B^1$ of the generator. The field coil D of the generator is in the circuit from the negative brush $B^1$ of the generator, through $F^1$ to terminal G of the automatically controlled rheostat R through the rheostat to terminal $G^1$, branch $F^2$ to the positive generator lead $F^3$ at terminal $G^2$. Rheostat R is provided with an arm P sweeping over the contacts $R^1$, $R^2$, &c., to regulate the current in the field winding D in the well known manner. The arm P is automatically moved over its contacts by any of the well known means employed for the purpose in rheostats of this character, such, for instance, as that shown in Fig. 2. In this figure contact arm P is shown mounted to rotate with a double toothed ratchet wheel $a$. An arm $b$ is pivotally mounted on the axis of the ratchet wheel and is caused to oscillate by means of a slot and pin connection with a worm gear $c$. A shaft $d$ has a worm $e$ engaging the gear $c$. This shaft is driven by any suitable means, such, for instance, as by a connection with a motor. Pivotally mounted on arm $b$ is a double pawl $f$, having a depending arm $g$ the lower end of which is on line with the axis of ratchet wheel $a$. Connected to the lower end of the depending arm $g$ through the medium of connecting rod $h$ is armature $i$ of a double coil relay $l$. Coil $l^1$ of this relay acts to pull the armature $i$ to the right causing the pawl $f$ to engage the ratchet $a$ to swing arm P to cut in resistance; coil $l^2$ acting in a similar manner to swing arm P in the opposite direction to cut out resistance. Relay $l$ is in circuit $k$, $k^1$ controlled by a circuit closer $n$ having contacts $k^2$, $k^3$. Circuit closer $n$ is operated by a relay $p$ acting in opposition to a spring $q$. Relay $p$ is connected across the generator terminals so as to be affected by voltage fluctuations in the generator circuit, lead $t$ coming from the positive terminal and lead $t'$ going to the negative terminal of the generator. A branch $v$ connects the middle point of coils $l^1$ and $l^2$ with lead $t^1$. The operation of this device is as follows: Relay $p$ and spring $q$ are adjusted to exert equal opposing pulls on the closer $n$ when the generator voltage is of the desired magnitude required for the load. The closer $n$ then stands in the middle position and the circuit of relay $l$ being open at contacts $k^2$, $k^3$, this relay is inoperative. When the generator voltage rises relay $p$ operates causing closer $n$ to make contact at $k^3$. This causes coil $l$ to be energized and exert a pull on rod $h$ and arm $g$, swinging pawl $f$ into engagement with ratchet wheel $a$ thus enabling the oscillations of arm $b$ to move arm P step by step to cut in more resistance to the generator field circuit and thereby reduce the voltage. On the voltage decreasing, spring $q$ overpowers relay $p$ whereupon arm $n$ closes contact at $k^2$, causing coil $l^2$ to become energized and exert a thrust on rod $h$. This causes pawl $f$ to be swung in the opposite direction causing arm P to be moved to cut out resistance in the generator field circuit.

The system further comprises a storage battery H connected to the lamp circuit in parallel with the generator in the branch $K^1$ from the line K, contacts 1 and 2 of a circuit closer M, tap $N^4$, branch $N^3$ to the lamp circuit at $B^2$.

Connected to the battery lead $K^1$ is the armature N of a booster O which is connected to the lamp circuit at $B^2$ through connection $N^3$. This booster may be of any suitable type, the one shown in the drawing being of the differential type for regulating the charge entering the battery and having a series field coil $N^1$ and shunt field coil $N^2$ the latter being connected across the circuit from wire K to contacts 3 and 4 of circuit closer M, through tap $N^4$, connection $N^3$, to $B^2$ in the positive side of the circuit to conductor B. The motor for driving the booster is shown at L and is permanently connected across the generator circuit from wire K to terminal $G^2$ in a connection $L^2$.

$L^1$ is the field coil for the motor.

The rheostat R is provided with two contact rings $r$, $s$, with which its arm P makes contact. Ring $r$ is of greater length than ring $s$, so as to make contact with arm P before the latter makes contact with ring $s$. Ring $r$ is connected to terminal $S^2$ from which leads a connection $r^2$ to the coil $T^1$ of circuit closer $m$ and thence to connection K. Ring $s$ is connected to terminal $S^1$ from which leads a connection $s^3$ to coil T of circuit closer M thence to wire K.

The operation of the system is as follows: The generator being idle, or its voltage insufficient for the lamps, arm P will be in its position of rest, as seen in the drawing. The circuit through the circuit closer coils T and $T^1$ will be open since in this position there is no contact between the arm P and rings $r$ and $s$. Circuit-closer $T^1$ will be in open position and circuit closer T will be in the lower position as seen in the drawing, closing contacts 1 and 2. Battery H is thus directly connected to the load through $K^1$, circuit closer M connection $N^4$ and $N^3$. The battery thus supplies the current for the lights. The generator being started and its speed such as to develop voltage sufficient for the lamps, arm P moves over its contact $R^1$, until it makes contact with ring $r$. Circuit closer coil $T^1$ is thus energized and this closer is operated to close contacts 5 and 6. This connects the generator with the load through branch $L^3$. The battery now floats and the generator supplies the lights. Upon further increase of speed of the generator, arm P moves over more contacts $R^2$, etc., cutting more resistance into the generator field coil and makes contact with ring $s$. This closes the circuit of coil T of circuit closer M, and this closer opens contacts 1 and 2 and closes contacts 3 and 4. This opens the booster short-circuit and the direct connection of the battery to the load through $K^1$ and puts the booster N in series with the battery, closing the circuit of the booster shunt field winding $N^2$ which now becomes energized. The battery then will be enabled to receive a charge, the booster supplying the extra necessary voltage for this purpose. The generator voltage is kept practically constant by the automatic regulating effect of the rheostat on its field windings.

My invention thus provides a system of greatly simplified construction and arrangement in which the generator voltage is required and regulated to be sufficient only to supply the load and in which auxiliary devices are employed for raising the generator voltage to enable the battery to receive a charge. Heretofore in axle driven car lighting systems it has been the practice to generate sufficient voltage in the main generator to enable the battery to receive a charge and to employ means for reducing the voltage generated to that required for the lamps or load circuit. This practice is objectionable in that it involves considerable loss in efficiency and also involves the employment of current and voltage regulators to maintain a constant output from the generator as well as voltage regulators for the lamp or load circuit. However, certain features of my invention may be used to advantage with such prior systems, or systems similar thereto, if desired. My invention further enables the storage battery to be charged and operate in a manner most favorable to its life and efficiency.

Having thus described my invention the following is what I claim as new and desire to secure by Letters Patent:

1. In a system of electrical distribution, the combination with a load circuit, a generator and a storage battery for supplying the same, and a booster to assist charging the battery of an automatic voltage regulator for the generator, circuit opening and closing devices controlled by said regulator, one of said devices in the generator circuit controlling the connection of the generator with the load circuit and another of said devices in the battery and booster circuits controlling the operation of the battery and booster.

2. In a system of electrical distribution, the combination with a load circuit, a generator and a storage battery in parallel for supplying said circuit, and a booster, of an automatic voltage regulator for the generator, said regulator having a movable contact arm, means for moving said arm in response to changes in generator voltage, circuit opening and closing devices controlled by said contact arm, one of said devices in the generator circuit, and another of said devices controlling the operation of the battery and booster.

3. In a system of electrical distribution, the combination of a load circuit, a generator, a storage battery, circuits connecting the battery and generator in parallel with the load circuit, a booster, a voltage regulator for the generator, a circuit closer in the battery circuit for connecting the battery direct to the load for battery discharge, a circuit closer in the generator circuit operating to connect the generator to the load at a predetermined generator voltage, and means dependent upon increase of generator voltage above the said predetermined amount to open the discharge circuit of the battery and connect the booster and battery in series for battery charge, said means and circuit closers controlled by the voltage regulator.

4. In a system of electrical distribution, the combination of a load circuit, a generator, a circuit for connecting the generator to the load, a storage battery, separate charging and discharging circuits connecting the battery to the load circuit, a booster in series in the charging circuit, circuit-controlling devices in each of said circuits, a voltage regulator for the generator, means dependent upon generator voltage for operating said circuit controlling devices to close the battery discharge circuit when the generator voltage is below that required in the load circuit, to close the generator circuit when the generator voltage equals that required in the load circuit, and to open the battery discharge circuit and close the battery charging circuit upon increase of generator voltage above that required for load.

5. In a system of the character described the combination of a load circuit, a storage battery, a booster and a generator, two branch circuits leading from the battery, one of the said branches connecting the battery directly with the load circuit, the other branch connecting the booster and battery in series relation to the load circuit and automatically operating means for closing the first named branch and short-circuiting the booster for battery discharge and for connecting the battery and booster in series to the load circuit for battery charge.

6. In a system of electrical distribution, the combination of a load circuit, a generator, a storage battery and booster operatively connected thereto, means for short circuiting the booster and connecting the battery directly to the load circuit and for effecting the opening of said short circuit, and connecting the battery and booster in series responsive to departures from a predetermined value of generator voltage.

7. In a system of electrical distribution, the combination with a load circuit, a generator and a storage battery for supplying the same, of a booster for assisting charging of the battery, an automatically operated voltage regulator for the generator, and means controlled by said voltage regulator for connecting and disconnecting the booster.

8. In a system of the character described, the combination of a load circuit, a generator connected direct to the load circuit, an automatic voltage regulator for the generator, a storage battery and booster, a circuit connecting the battery to the load circuit direct, a circuit for connecting the battery and booster in series to the load circuit, a circuit closer controlled by the voltage regulator of the generator, said circuit closer in one position thereof closing the direct circuit of the battery to the load and short circuiting the booster for battery discharge and in the other position thereof opening said booster short circuit, and connecting the battery and booster in series to the load for battery charge.

9. In a system of the character described, the combination of a load circuit, a generator having a circuit connecting the same directly with the load, a storage battery and booster and circuits for connecting the same to the load, one of said circuits connecting the battery direct to the load and forming a short-circuit for the booster, another of said circuits connecting the battery and booster in series with the load, and another of said circuits including the exciting coil of the booster field, a voltage regulator for the generator and a circuit-controlling device controlled by said voltage regulator and controlling said battery and booster circuits whereby the battery is connected direct with the load, the booster short circuited and the circuit of the exciting coil of the booster field opened for a battery discharge and is connected in series with the booster, the booster short-circuit opened, and the circuit of the exciting field coil of the booster closed for a battery charge.

10. In a system of electrical distribution, the combination with a load circuit, a generator, a storage battery, of separate charging and discharging circuits for the storage battery, a booster in series in the charging circuit, means for connecting the battery direct to the load circuit for battery discharge, means for automatically connecting the generator to the load circuit at a predetermined generator voltage, and means for automatically opening the battery discharge circuit and closing the charging circuit upon an increase of generator voltage beyond said predetermined amount.

11. In a system of the character described the combination with a load circuit, a storage battery, booster and generator having connections with the load circuit, an automatically operated rheostat for controlling the generator voltage, of contact pieces on said rheostat for controlling the connection of the battery, booster and generator with the load circuit, one of said contacts controlling the connection between the generator and the load circuit and the other controlling the battery and booster connection to the load circuit.

12. In a system of the character described the combination with a load circuit a storage battery, a booster, a generator and an automatic voltage regulator for the generator, of means for directly connecting the battery to the load circuit when the generator voltage is below that required for the load, means for connecting the generator to the load circuit in parallel with the battery when its voltage is equal to that of the load circuit and means for connecting the booster in series with the load circuit and the battery when the generator voltage tends to exceed that required for the load circuit.

13. In a system of the character described, the combination of a load circuit, a generator for supplying the same, an automatically operated voltage regulator, said regulator comprising a movable arm and a contact strip in the path thereof, a circuit closer for connecting the generator to the load circuit, a circuit across the generator terminals including therein said movable arm and contact strip and the energizing coil of said circuit closer, whereby said circuit closer is operated at a predetermined generator voltage.

14. In a system of the character described, the combination of a load circuit, a storage battery and booster, two branch circuits connecting said battery to the load circuit, one of said branches connecting the battery direct to the load, the other of said branch circuits connecting the battery and booster in series to the load, a circuit closer controlling both said circuits and the exciting field coil of the booster, a generator connected to the load circuit, a circuit closer in the generator circuit, an automatically operated voltage regulator for the generator, said regulator comprising a movable arm, a pair of contact strips in the path of said arm, circuits connected across the generator each having included therein said movable arm, one of said contact strips and the energizing coil of one of said circuit closers, whereby said generator, battery and booster circuits are controlled by said voltage regulator, the contact strip in the circuit of the energizing coil of the generator circuit closer arranged to be engaged by said contact arm before the contact strip in the circuit including the energizing coil of the circuit closer controlling the battery and booster circuits.

15. In a system of electrical distribution, the combination of a load circuit, a generator for supplying the same, a storage battery having a circuit connecting the same to the load circuit, a booster and a circuit connecting the same in series with the battery and the load, a variable resistance device in the field circuit of the generator, said device having a movable contact arm, means for moving said arm in response to changes in generator voltage, fixed contacts in the path of said arm, circuit closers controlling the generator circuit, the battery circuit and the battery and booster circuit, operating coils for said circuit closers connected with said fixed contacts, whereby the generator is connected in circuit with the load and the battery and battery and booster circuits are opened and closed at predetermined generator voltages.

16. In a system of electrical distribution, the combination of a load circuit, a generator for supplying the same, a storage battery having a discharge circuit connecting the same with the load circuit, a charging circuit for the battery, a differential booster in series in the charging circuit, an automatically operating voltage regulator for the generator, and a circuit closer for the circuit of the exciting coil of the booster field, said circuit closer controlled by said voltage regulator.

17. In a system of electrical distribution, the combination of a load circuit, a generator having direct connection to the load circuit, a booster, a storage battery, branch circuits connecting said battery to the load circuit, one of said branches leading from the battery to the load circuit direct, the other of said branches connecting the battery and booster in series to the load, a circuit including therein the exciting field coil of the booster, a circuit closer controlling the generator circuit and a circuit closer controlling the battery, battery and booster and booster field coil circuits, an automatically operated variable resistance device in the field circuit of the generator, said device having a movable contact arm, contact pieces arranged in the path of said movable arm, circuits including each of said contact pieces, the movable arm and one of said circuit closers, whereby said movable arm operates to control said circuit closers, said contact pieces arranged to be engaged at different positions of the contact arm corresponding to different predetermined generator voltages, whereby when the generator reaches a predetermined voltage it is connected direct to the load circuit and upon said voltage tending to rise the battery and booster in series are connected to the load circuit.

18. In an electrical system of distribution, the combination of a source of electromotive force, a work circuit fed thereby, a storage battery connected across the work circuit, a booster, means for connecting the booster in series with the battery and means for short-circuiting said booster responsive to variations in the electrical condition of the system.

19. In an electrical system of distribution, the combination of a source of electromotive force, a consumption circuit connected thereto, a storage apparatus in operative relation therewith, a booster provided with a shunt field, means for connecting the booster in series with the battery and means for rendering said shunt field inoperative responsive to variations in the electrical condition of the system.

20. In an electrical car lighting system, a generator driven at a variable speed, means for maintaining the voltage of the generator substantially constant responsive to voltage variations thereof, a consumption circuit connected to said generator to be fed thereby, a storage battery and its circuit in operative relation thereto, a regulator for regulating the battery charging current in the battery circuit and means responsive to variations in the voltage of the generator for connecting the battery either directly to the consumption circuit or to the consumption circuit in series with the regulator.

21. In an electrical car lighting system, a generator driven at a variable speed, means for regulating the voltage of the generator responsive to variations in the electrical condition of the system, a consumption circuit connected to said generator to be fed thereby, a storage battery and its circuit in operative relation thereto, a regulator for regulating the battery charging current in the battery circuit and means responsive to variations in the electrical condition of the system for connecting the battery either directly to the consumption circuit or to the consumption circuit in series with the regulator.

22. In an electrical system of distribution, a generator driven at a variable speed, means for maintaining the voltage of the generator substantially constant, a work circuit operatively arranged with the generator, a storage battery connected thereto, a booster and a device controlled by said means for connecting the booster in series with the battery.

23. In an electrical system of distribution, a generator driven at a variable speed, means for maintaining the voltage of the generator substantially constant, a work circuit operatively arranged with the generator, a storage battery connected thereto, a booster and a device controlled by said means for rendering the booster substantially inoperative.

24. In an electrical system of distribution, the combination of a generator driven at variable speeds, a field for said generator, means operating upon said field for maintaining the voltage of the generator substantially constant, a work circuit fed by said generator, a storage battery in operative relation thereto, a booster and an electro-responsive device for connecting said booster in series with the battery.

25. In an electrical system of distribution, a generator driven at a variable speed, means for maintaining the voltage of said generator substantially constant, a work circuit connected to said generator and arranged to operate on said substantially constant voltage, a storage battery in operative relation therewith, a booster and means responsive to variations in the electrical condition of the system for connecting the battery either directly with the work circuit or with the work circuit in series with the booster.

JOHN W. JEPSON.

Witnesses:
 GEORGE R. BERGER,
 H. C. WORKMAN.